Feb. 4, 1964 F. WESTBERG 3,120,589
SWITCH CONTROL APPARATUS, ESPECIALLY FOR GAS BURNER VALVES
Filed Jan. 22, 1962
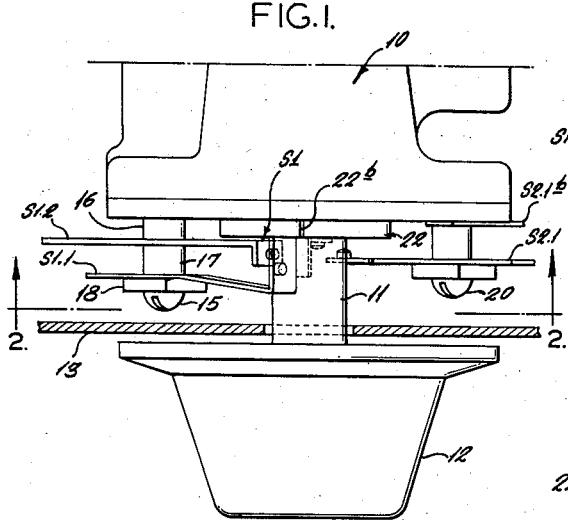
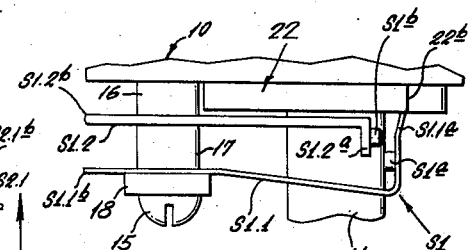
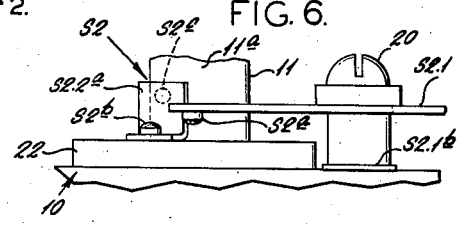
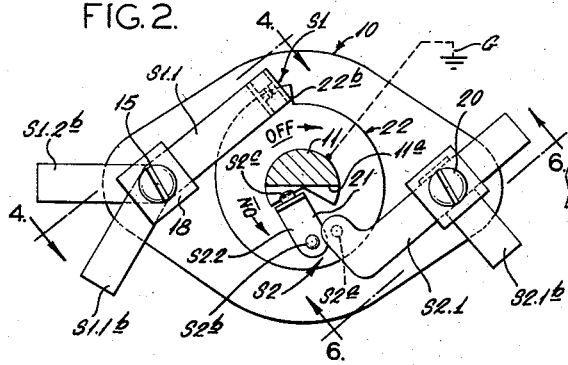
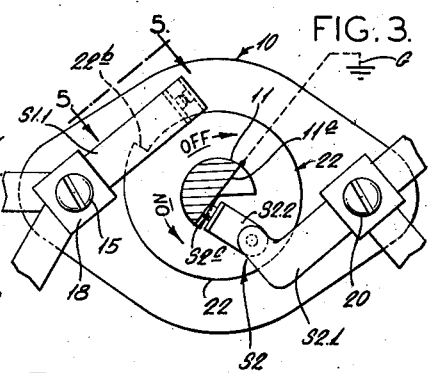
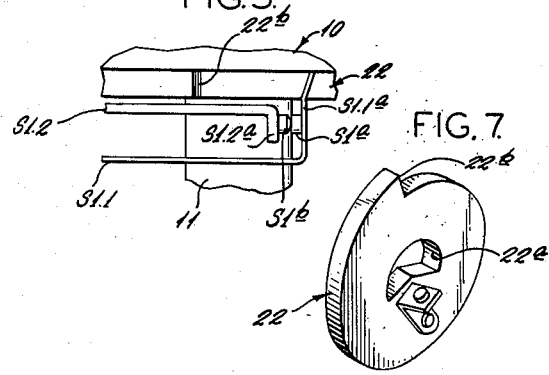
INVENTOR:
FRED WESTBERG
BY Howson & Howson
ATTYS.

United States Patent Office 3,120,589
Patented Feb. 4, 1964

3,120,589
SWITCH CONTROL APPARATUS, ESPECIALLY FOR GAS BURNER VALVES
Fred Westberg, North Olmsted, Ohio, assignor to American Gas Association, Incorporated, New York, N.Y., a corporation of New York
Filed Jan. 22, 1962, Ser. No. 167,723
6 Claims. (Cl. 200—61.86)

This invention relates to switch control apparatus, especially for gas burner valves, and has for an object the provision of improvements in this art.

In certain installations, such for example as the control valve of a gas burner which is ignited by electrical means, it is very desirable that the igniter circuit shall be energized, as by the closing of a switcth, when the valve is turned in the "on" direction to supply gas to the burner and it is equally desirable that the circuit shall not be energized when the valve is turned to the "off" position.

It is also desirable that the circuit shall be closed for only a limited period of time when the valve is turned on whereby the pilot burner which is ignited shall be lighted for only a limited time in order to save gas and also to save electric current.

It is further desirable that another switch be operated when the gas valve is turned to the fully "off" position, as for example to open the main circuit switch and de-energize the whole system.

Accordingly it is an object of the present invention to provide switch control apparatus which will close a certain switch line when a control is moved in one direction but to avoid closing it when the control is moved in the other direction.

It is a further object to provide switch control apparatus which will close the switch line and again open it as the control is moved in one direction.

It is another object to provide switch control apparatus of the above noted character which will operate another switch when the control is moved to an extreme position in the reverse direction.

It is yet a further object of the invention to provide switch control apparatus of the above character and capabilities which is simple, sturdy and reliable.

The above and other objects and advantages of the invention will be apparent from the following descriptiton of an exemplary embodiment, reference being made to the accompanying drawings wherein:

FIG. 1 is a top plan view of switch control apparatus associated with a main control as, for example, the valve of a gas burner;

FIG. 2 is an elevation, with some parts in section, as along the line 2—2 of FIG. 1, showing the switches and the switch operating means;

FIG. 3 is a view like FIG. 2 but showing the parts in a different position;

FIG. 4 is a side-top view taken on the line 4—4 of FIG. 2;

FIG. 5 is a side-top view taken on the line 5—5 of FIG. 3;

FIG. 6 is a side-bottom view taken on the line 6—6 of FIG. 2; and

FIG. 7 is an isometric view of a detail element.

A control device 10, which here is indicated to be the valve of a main gas burner, has a turnable gas control plug operated by a stem on shaft 11 and a knob 12. A front casing panel of the stove is shown at 13.

It is desired that the gas control shall also act as a switch control to operate switches in an associated circuit. To this end certain such switches are mounted in convenient adjacent positions where they will be operated conjointly and coincidently with the operation of the valve. As here shown, there is a main on-off power switch S1 which energizes and de-energizes an entire ignition circuit and an ignition switch S2 which produces an ignition effect for a limited period of time as the valve is turned in the "on" direction to supply gas to the burner.

The switch S1 includes cooperating contact points S1a and S1b mounted on adjacent flexible arms or blades S1.1 and S1.2 respectively. The blades are mounted on a post 15 with suitable insulating elements 16, 17 and 18 thereon. The contact points are located on angularly bent parts S1.1a and S1.2a of the blades and at a distance to one side of the axis of the valve stem or shaft 11 so that the contacts can be separated either by moving them apart in a circumferential direction or by moving them apart in an axial direction. As herein arranged they have components of movement in both the circumferential and axial directions but largely in the axial direction.

The blades S1.1 and S1.2 continue beyond the post 15 in the elements S1.1b and S1.2b which serve as leads connecting them in the electrical control circuit.

The ignition switch S2 includes the contact points S2a and S2b, the former being secured on a blade S2.1 carried by a fixed post 20 and the latter being carried by one angular portion S2.2 of a bent plate 21 secured on an insulating disk 22 loosely mounted for limited turning movement on the shaft 11. The post mounting for the blade S2.1 is provided for limited adjustment to vary the point of ignition and a lateral element S2.1b connects the blade S2.1 into an electrical circuit.

The other angular part S2.2a of the bent plate 21 carries a contact point S2c which is adapted in certain stages of movement to engage a flat surface 11a formed on the stem or shaft 11. The shaft is arranged to be in circuit, as by grounding at G, indicated by broken lines.

The flat surface 11a is formed approximately on the diameter of the shaft. The insulated disk 22 has a shaft receiving opening 22a which is of greater circumferential extent than the solid part of the shaft which it receives whereby there is circumferential play or lost motion between the disk and shaft which is sufficient in extent to cause the contact point S2c to engage the flat portion 11a of the shaft when the shaft is turned in the "on" or gas supply direcion (counter-clockwise here) and to separate from the flat portion when the shaft is turned in the "off" or gas shut off direction (clockwise here).

The outer peripheral surface of the disk 22 is formed with a radial cam shoulder 22b which, when the disk is turned with the shaft to the "off" position, engages the laterally bent end S1.1a of the switch blade S1.1 and first separates the contact points S1a and S1b by circumferential movement and thereafter moves the bent part S1.1a axially to move the contact points apart axially. The bent part S1.1a is seen to have a cam shaped end to aid in this action.

In operation, when the valve stem or shaft 11 is turned in the "on" direction (counter-clockwise), as shown in FIG. 3, its flat surface 11a drives the insulating disk 22 by engagement with the contact point S2c. This connects the whole L-shaped plate 21 to ground. When the disk turns it will cause the contact S2b to wipe over contact S2a to make or complete the igniion circuit and then break it. At the start of the turning movement the switch S1 is closed to energize the main ignition circuit.

When he valve stem or shaft is turned in the "off" direction (clockwise) the disk 22 lags behind and causes contact point S2c to separate from the shaft; and although the contact point S2b passes over the contact point S2a in his reverse movement there will be no flow of ignition current because the line is open at contact point S2c.

At the end of the off movement the main switch S1 is opened in the manner previously described.

It will be apparent that when the valve is turned toward the on position the disk 22 will lag behind until the shaft 11 begins to turn it, because of the friction of the bent part S1.1a against the side of the disk 22; and when the valve is turned toward the off position the disk will be held back by the friction between contacts S2a and S2b while passing each other until the shaft begins to turn the disk. The described arrangement comprises one form of means for causing the disk to lag behind the turning of the shaft in each direction until the lost motion is taken up and the shaft begins to turn the disk positively for the remainder of the shaft movement in each direction.

It is thus seen that the invention provides simple, rugged and dependable apparatus for operating the switches in the manner desired to produce proper ignition at the burner.

While one embodiment has been described for purposes of illustration it is to be understood that there may be various embodiments and modifications within the general scope of the invention.

I claim:

1. Switch control apparatus, as for the ignition of a gas burner having a control valve, comprising in combination, a gas control valve having an operating shaft, a disk member mounted on said shaft and having limited circumferential free movement relative thereto, a contact element carried by said shaft, a fixed contact mounted adjacent said disk member, and an intermediate switching member carried by said disk, said intermediate member having one contact located where it will engage said fixed contact when the disk is rotated and a second contact arranged to engage the contact element carried by said shaft when the shaft is being turned in one direction but to stand away from said shaft contact when the shaft is turned in the other direction due to the circumferential free movement of the disk on the shaft.

2. Switch control apparatus as set forth in claim 1, further characterized by the fact that said shaft is formed with a flat portion which constitutes the contact element thereof.

3. Switch control apparatus as set forth in claim 1, which further includes a second switch arranged adjacent said shaft, said second switch including a flexible blade carrying one contact of the switch, and an operating element on said disk which operates on said blade to close and open the switch at one limit of movement of the disk.

4. In a control system for electrical ignition of gas, switch control apparatus, comprising:
   a momentary contact switch comprising a first conductive switch element, a second conductive switch element, and means mounting said first and second switch elements for relative movement to press them against each other momentarily in the course of motion of said first switch element in either direction between first and second predetermined positions thereof; and
   lost motion means for advancing said first switch element from said first predetermined position to said second predetermined position in response to one sense of operation of said lost motion means and from said second predetermined position to said first predetermined position in response to the opposite sense of operation of said lost motion means;
   said lost motion means having a conductive portion positioned to bear against said first switch element upon advance thereof from said first predetermined position to said second predetermined position and to retract from said first switch element upon advance thereof from said second predetermined position to said first predetermined position;
   said lost motion means also having a portion insulated from said conductive portion and positioned to bear against said first switch element upon advance of said first switch element from said second predetermined position to said first predetermined position;
   whereby said conductive portion of said lost motion means is electrically connected to said first switch element when said first switch element momentarily contacts said second switch element during advance thereof from said first predetermined position to said second predetermined position, but is electrically disconnected therefrom when said first switch element momentarily contacts said second switch element during advance thereof from said second predetermined position to said first predetermined position.

5. Apparatus in accordance with claim 4, comprising a gas valve, a rotatable gas control for said valve connected to said lost motion means for moving said lost motion means to advance said first switch element back and forth between said first and second predetermined positions thereof and to press said first and second switch elements together when said gas valve is opened.

6. Apparatus in accordance with claim 5 comprising an additional switch, and means responsive to operation of said gas control to close said additional switch when said first switch element is in said first predetermined position and to close said additional switch as said first switch element is advanced toward said second predetermined position thereof.

References Cited in the file of this patent
UNITED STATES PATENTS

| | | |
|---|---|---|
| 1,833,774 | Cronk | Nov. 24, 1931 |
| 2,037,148 | Reeves | Apr. 14, 1936 |
| 2,596,505 | Pacifico | May 13, 1952 |